(12) United States Patent
Brannock

(10) Patent No.: US 10,769,269 B2
(45) Date of Patent: Sep. 8, 2020

(54) METHOD AND APPARATUS TO GATHER PLATFORM CONFIGURATION PROFILE IN A TRUSTWORTHY MANNER

(71) Applicant: INTEL CORPORATION, Santa Clara, CA (US)

(72) Inventor: Kirk D. Brannock, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 140 days.

(21) Appl. No.: 16/024,781

(22) Filed: Jun. 30, 2018

(65) Prior Publication Data
US 2019/0050232 A1 Feb. 14, 2019

Related U.S. Application Data

(60) Provisional application No. 62/530,582, filed on Jul. 10, 2017.

(51) Int. Cl.
| | | |
|---|---|---|
| G06F 21/44 | (2013.01) | |
| G06F 9/4401 | (2018.01) | |
| G06F 13/24 | (2006.01) | |
| G06F 9/455 | (2018.01) | |
| G06F 21/70 | (2013.01) | |
| G06F 21/30 | (2013.01) | |

(52) U.S. Cl.
CPC ............ *G06F 21/44* (2013.01); *G06F 9/4401* (2013.01); *G06F 9/45533* (2013.01); *G06F 13/24* (2013.01); *G06F 21/30* (2013.01); *G06F 21/70* (2013.01); *G06F 2009/45575* (2013.01); *G06F 2009/45579* (2013.01); *G06F 2213/24* (2013.01)

(58) Field of Classification Search
CPC ...... G06F 13/24; G06F 2213/24; G06F 21/30; G06F 21/44; G06F 21/70; G06F 21/71; G06F 21/72; G06F 9/4401
See application file for complete search history.

(56) References Cited

U.S. PATENT DOCUMENTS

| | | | | |
|---|---|---|---|---|
| 2004/0103299 A1* | 5/2004 | Zimmer | ................... | G06F 21/57 726/26 |
| 2007/0016766 A1* | 1/2007 | Richmond | .............. | G06F 21/53 713/100 |
| 2008/0235754 A1* | 9/2008 | Wiseman | ............ | G06F 9/45533 726/1 |
| 2012/0297057 A1* | 11/2012 | Ghosh | ................... | G06F 21/575 709/224 |
| 2012/0297177 A1* | 11/2012 | Ghosh | .................... | G06F 21/53 713/2 |
| 2013/0159726 A1* | 6/2013 | Mckeen | .................. | G06F 21/72 713/189 |
| 2016/0070932 A1* | 3/2016 | Zimmer | .................. | G06F 21/72 713/192 |
| 2017/0177245 A1* | 6/2017 | Gonzalez Diaz | ... | G06F 12/1408 |
| 2017/0177873 A1* | 6/2017 | Raghuram | ............ | H04L 9/0894 |

* cited by examiner

*Primary Examiner* — Glenn A. Auve

(57) ABSTRACT

Various embodiments are generally directed to an apparatus, method and other techniques for gathering configuration information of a computer system during a system management mode of the computer system and exposing the gathered configuration information to securely attest to the configuration of the system.

18 Claims, 6 Drawing Sheets

METHOD AND APPARATUS TO GATHER PLATFORM CONFIGURATION PROFILE IN A TRUSTWORTHY MANNER

CROSS-REFERENCE TO RELATED APPLICATIONS

This application claims the benefit of U.S. Provisional Application Ser. No. 62/530,582 filed Jul. 10, 2017, entitled "Method and Apparatus to Gather Platform Configuration in a Trustworthy Manner," which application is incorporated herein by reference in its entirety.

TECHNICAL FIELD

Embodiments described herein generally relate to techniques to provide a profile of a computer system configuration.

BACKGROUND

A computer system typically includes several hardware components including a processor to process information and data. These platform components can be organized in a variety of ways. Furthermore, the computer system can be provisioned or configured to protect ones of the hardware components, or portions of a hardware component. For example, the processor may operate in a normal mode, such as when running a typical operating system for normal data processing; or an isolated mode, such as the system management mode (SMM) for platform specific tasks. SMM allows system developers and operators to provide functions like power management or security, in a manner that is transparent to the operating system (OS) and other application programs.

It is to be appreciated, overall security of the computer system is related to correct configuration of the hardware components that make up the system. Typically, this configuration is done by a basic input-output system (BIOS) or a unified extensible firmware interface (UEFI). In some cases, computer systems can be configured incorrectly or contain code that is insufficiently robust with regard to malicious exploitation of exposed interfaces. Exploitable vulnerabilities can be introduced by these types of misconfiguration or coding errors. With some of these cases, the misconfiguration or coding error may not result in a functional failure allowing such errors to go unobserved unless and until it is discovered, either through security validation, security researchers, or malware writers.

DETAILED DESCRIPTION

Figure 1:
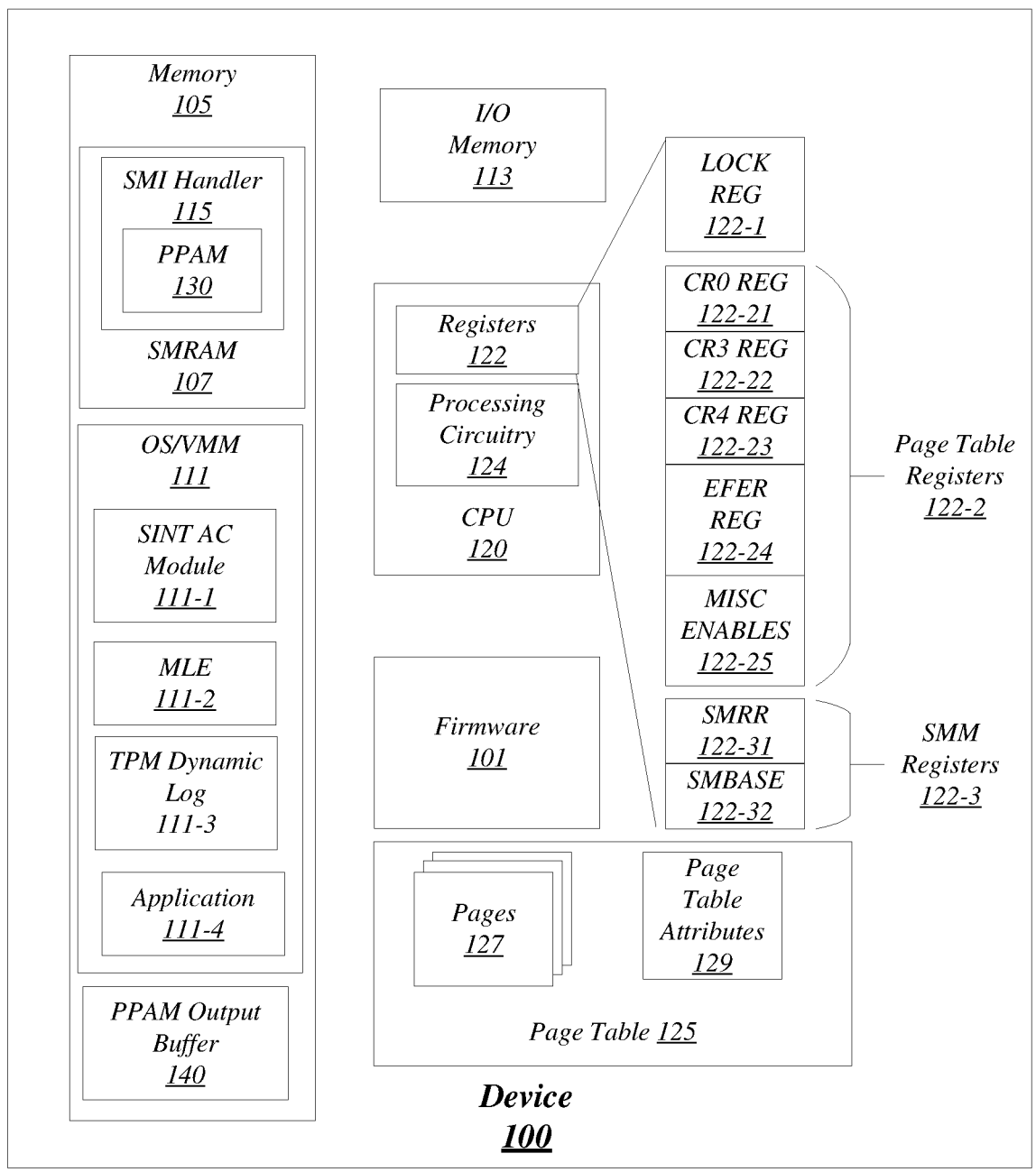
FIG. 1 illustrates an example embodiment of a device.

Various embodiments may be generally directed to generating a trustworthy and attestable assessment of the "state" or configuration of a computer system (or computing platform). Conventional attempts at computer system configuration validation suffer from a few limitations. For example, conventional computer system configuration checkers cannot observe configuration details that are restricted to SMM. As another example, conventional computer system configuration checkers can be subverted by the environment they are checking. The present disclosure provides for creating a trustworthy and attestable assessment of a computer system configuration to overcome these limitations. One embodiment allows inspection and attestation of SMM. The utility is not limited to SMM, however as other embodiments may produce trustworthy attestation of non-SMM components or code as well.

If implemented on a computer system, Trusted Execution Technology® (TXT) by Intel® Corporation can provide a hardware rooted dynamic trust chain which does not include any platform firmware. Although the present disclosure provides a number of example embodiments that utilize Intel TXT for explanation purposes, the present disclosure can be implemented to provide inspection or attestation of SMM invoked using other types of trusted platform modules, such as, for example any computer system with the ability to provide a hardware rooted dynamic trust chain.

In some implementations, a computer system can enter SMM via a hardware interrupt referred to as a System Management Interrupt (SMI). Said differently, software executing on a computer system can execute platform firmware code known as the SMI handler in SMM via an SMI. Using such an example, Intel® TXT may provide separation from the SMI handler for software that is rooted in the dynamic trust chain.

With some examples, a virtualized agent operates or runs in SMM. For example, some SMM systems execute a virtualized agent referred to as an SMI Transfer Monitor (STM) where the STM separates software that is rooted in the dynamic trust chain from the SMI handler.

For example, in some computer systems, STM mediates resource accesses by the BIOS SMI handler by virtualization of the BIOS SMI handler into a virtualized agent (or "VT guest") with appropriate access controls. The TXT launch process will extend the hash of the STM into a configuration register (e.g., Trusted Platform (TPM) Platform Configuration Register (PCR), or the like), thereby providing attestation of the identity of the STM to the software that is rooted in the dynamic trust chain.

The present disclosure provides an alternative to STM. Said differently, the present disclosure does not need to rely on virtualization for isolation and mediation of resource accesses. Rather, a trusted portion of the SMI handler itself is used to mediate the resource accesses by the remainder of the SMI handler. In the present disclosure, attestation of the trusted portion of the SMI handler is done using a component known as a Platform Properties Assessment Module (PPAM). The PPAM is similar to an STM in that the TXT launch process will extend the hash of the PPAM into a configuration register (e.g., Trusted Platform (TPM) Platform Configuration Register (PCR), or the like), thereby providing attestation of the identity of the PPAM to the software that is rooted in the dynamic trust chain. The PPAM itself inspects the trusted portion of the SMI handler code and configuration to determine the SMI handler's integrity and isolation properties.

The present disclosure provides a PPAM arranged to gather configuration information from the hardware and trusted portion of the SMI handler code and generate a report including indications of the configuration and code integrity. This report is provided to the application which invoked the PPAM.

Typically, a PPAM does not virtualize the BIOS SMI handler as is done by a conventional STM for the purposes of resource policy enforcement. Rather, the PPAM simply attests to the integrity of the trusted portion of the SMI handler and the details of resource policy contained therein.

As noted above, the present disclosure can be implemented with Intel® TXT. However, examples are not limited in this context.

FIG. 1 illustrates an example embodiment of a device 100 in which aspects of the present disclosure may be employed. The device 100 may include a number of devices, systems, components, circuitry and infrastructure to provide a secure SMM. Device 100 may include firmware 101, memory 105, a computing processing unit (CPU) 120, one or more page tables 125 having any number of pages 127 and page table attributes 129. FIG. 1 illustrates device 100 having a limited number of features and embodiments are not limited in this manner.

The device 100 may be embodied as any type of computing device, including a personal computing, a desktop computer, a tablet computer, a netbook computer, a notebook computer, a laptop computer, a server, server farm, blade server, or any other type of server, embedded computing platform, and so forth. In some embodiments, the device 100 may be a communication station, a mobile station, an advanced station, a client, a platform, a wireless communication device, a mobile computer, a set-top box, a handheld computer, a handheld device, a Personal Digital Assistant (PDA) device, a handheld PDA device, netbook, a mobile telephone, a smart phone, a mobile cellular telephone, and so forth. Embodiments are not limited in this manner.

The memory 105 may include a portion having regions that may be allocated with a system management random access memory (SMRAM) 107 which may be further installed with an SMI handler 115. The memory 105 may also include other regions or a second portion to store information and instructions for an operating system(s) (OS) and virtual machine manager(s) (VMM) in OS/VMM 111. In some embodiments, the device 100 may also include an I/O memory 113 or memory-mapped I/O to communicate with I/O devices.

The CPU 120 may include registers 122 and processing circuitry 124. In some embodiments, the device 100 may include one or more CPUs 120 which may include one or more cores to process information for the device 100. The CPU 120 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. In some embodiments, the CPU 120 may be connected to and communicate with the other elements of the computing system via one or more interconnects, such as one or more buses, control lines, and data lines.

CPU 120 may include a number of registers 122. CPU 120 can include a lock register 122-1, page table registers 122-2 and SMM registers 122-3. In general, lock registers 122-1 may be used to prevent malicious code and attacks using SMM code from modifying the page table attributes 129 and other registers 122. For example, the lock register 122-1 may be used to lock or prevent modification of paging related registers, such as the page table registers 122-2 and SMM related registers such as the SMM registers 122-3. The lock register 122-1 may be a model-specific register (MSR) and may be written to via the write the model-specific register (WRMSR) instruction. In some embodiments, the WRMSR instruction to write to the lock register 122-1 may occur in response to the occurrence of a SMI entry point, before the SMI code branches or consumes data. Effectively, the WRMSR instruction to write to the lock register 122-1 may be straight-line code that causes the lock to be set on each SMI before any possible vulnerability could be exploited. In some embodiments, the lock register 122-1 may be updated by the CPU 120 in response to an SMI close instruction. Further and as an alternative to using the lock register 122-1 on each SMI entry point, the page table registers 122-2 and SMM registers 122-3 may be set and permanently locked within the SMM but require an entry in the page table 125 with paging turned on. Note that in some embodiments, the entire lock register 122-1 may be set to lock down an associated paging table 125 and page table attributes 129. However, in the same or other embodiments, certain bits of the lock register 122-1 may be used to lock down an associated page table 125 and page table attributes 129. In some embodiments, one or more bits may each be associated with a different page table and page table attributes. Embodiments are not limited in this manner.

In general, the CPU 120 may include a number of page table related registers 122-2, such as a CR0 register 122-21, a CR3 register 122-22, a CR4 register 122-23, an EFER register 122-24, and one or more MISC ENABLE registers 122-25. These various page table registers 122-21 to 122-25 may control various aspects and settings of the page table 125 and pages 127. For example, the CR0 register 122-21 may be a control register that may be used to modify basic operations of the CPU 120 associated with paging and other processing. In another example, the CR3 register 122-22 may be used for virtual addressing and enables the CPU 120 to translate linear addresses into physical addresses by locating the page directory (not shown) and page table 125. The CR4 register 122-23 may be used for isolated mode to I/O breakpoints, page size extensions, and machine check extensions. The EFER register 122-24 may be a MSR that is used to allow and enable system call and system return instructions. The EFER register 122-24 may be used to control execute-disable (XD) and whether long mode is enabled for the page table 125.

In general, SMM registers 122-3 can include a number of registers, such as a system management range register (SMRR) 122-31 and an SMBASE register 122-32. The SMRR register 122-31 may be used to control caching for the CPU 120 in SMM while the SMBASE register 122-32 may include a pointer to the beginning of the SMM state-save map and may store the contents in a downward direction. Embodiments are not limited to these specific registers. The CPU 120 may also include other registers, such as the SMM_MONITOR_CTRL register, that may be related to SMM and may be locked via utilization of the lock register 122-1

The processing circuitry 124 may be circuitry that carries out the instructions of a computer program by performing the basic arithmetic, logical, control and input/output (I/O) operations specified by the instructions. For example, the processing circuitry 124 can include an arithmetic logic unit (ALU) that performs arithmetic and logic operations. In some instances, the registers 122 may supply operands to the ALU and store the results of ALU operations. The processing circuitry 124 may also include a control unit that fetches instructions from memory and "executes" them by directing the coordinated operations of the ALU, registers 122 and other components. Embodiments are not limited in this manner and the above-description only provides a high-level overview of processing by the processing circuitry 124 for the CPU 120.

Memory 105 may be any type of memory capable having one or more regions or portions to store information and data. In some embodiments, the memory 105 may include a first portion allocated as the SMRAM 107 to store information and instructions used with the SMM. In some embodiments, the SMRAM 107 may be referenced as SMM memory. Further, the SMRAM 107 may be a special portion of the memory 105 that is only accessible while the CPU 120 is operating in the SMM and to the SMM code. In some embodiments, the SMRAM 107 may be have the ability to be relocated within the memory 105 and locatable by the pointer in the SMBASE register 122-3-2. Thus, embodiments may include locking access to the SMBASE register 122-3-2 to secure the system while operating in the SMM.

Further, the SMRAM 107 may include an SMI handler 115 installed by the firmware 101 to handle SMIs to cause the device 100 to enter the SMM. The SMIs offer extended functionality, such as legacy hardware device emulation and system management tasks. As will be discussed in more detail below, the firmware 101 may be part of the basic input/output system (BIOS) or unified extensible firmware interface (UEFI) used to perform hardware initialization and performing the booting sequence. The SMI handler 115 may be inserted in the SMRAM 107 during an initialization phase of the device 100. For example, the SMI handler 115 may be installed during the power-on self-test sequence (POST) at a checkpoint and may be functional thereafter. Once the SMI handler 115 is installed and configured in the SMRAM 107, the SMI handler 115 may be locked, via a setting or register, to provide a more secure SMM environment.

The memory 105 may also include a second region allocated to the OS/VMM 111, which may be used by the OS and/or VMMs. For example, the memory 105 may store data momentarily, temporarily, or permanently for an OS, such as Windows®, Apple OS®, Linux®, UNIX®, VMMs, and so forth. Moreover, the memory 105 may store instructions and data for operating the device 100 and an OS. The memory 105 may also store temporary variables or other intermediate information while the CPU 120 is executing instructions for the OS. Embodiments are not limited in this manner.

OS/VMM 111 can include a number of files, executable modules, or applications. For example, this figure depicts OS/VMM 111 including SINIT AC module 111-1, MLE 111-2, TPM dynamic log 111-3, and application 111-4. These files, modules, or applications are referenced again below.

Memory 105 may further include a PPAM output buffer 140, which can be used to store output from the PPAM 130 (e.g., reports including indications of the configuration and code integrity, or the like). It is noted, that although PPAM output buffer 140 is depicted in memory 105, some embodiments may provide PPAM output buffer to be provisioned or allocated in memory of CPU 120 (e.g., cache, one or more registers 122, or the like).

The memory 105 may be one or more of random access memory (RAM), read-only memory (ROM), electrically erasable programmable read-only memory (EEPROM), flash memory, and so forth. The memory 105 is not limited to these memory components. For example, the memory 105 may include a non-transitory computer-readable storage medium.

In some embodiments, the device 100 may include input/output (I/O) memory 113 which may be mapped to enable peripheral devices to communicate and operate with the device 100 and CPU 120. In some instances, the mapped I/O memory 113 may be part of memory 105 and other instances mapped I/O memory 113 may utilize different, dedicated memory for I/O devices. In some embodiments, the mapped I/O memory 113 utilizes memory mapped I/O (MMIO) operations and/or port-mapped I/O (PMIO) operations to perform I/O between the CPU 120 and peripheral devices. MMIO uses the same address bus to address both memory 113 and I/O devices—the memory 113 and registers of the I/O devices are mapped to address values. Thus, when an address is accessed by the CPU 120, it may refer to a portion of physical memory 105, but it can also refer to memory of the I/O device. Thus, the CPU instructions used to access the memory 113 can also be used for accessing devices. Each I/O device monitors the CPU's 120 address bus and responds to any CPU 120 access of an address assigned to that device, connecting the data bus to the desired device's hardware register. Embodiments are not limited in this manner.

As noted, the device 100 includes at least one page table 125 having a number of pages 127. In the illustrated embodiment, the page table 125 may be an SMM page table that may be utilized by the CPU 120 during SMM. Although not illustrated as part of the memory 105, the page table 125 may be a data structure stored in the memory 105 that is used by the virtual memory system to store mappings between virtual addresses and physical addresses of the memory 105. In some embodiments, the pages 127 may include mapped code pages and mapped data pages. However, embodiments are not limited in this manner and the pages may store other types of data and information. In operation, the CPU 120 may include a memory management unit (MMU) (not shown) that may utilize the page table 125 to locate information via a physical address of the memory 105. In embodiments, a page table lookup may fail if a page is not resident in the physical memory, a translation cannot be performed, a requesting process does not have permission to access the information, and so forth.

As mentioned, the page table 125 may be an SMM page table and page protections may be applied to the page table 125 and pages 127 to prevent attacks. More specifically, one or more page table attributes 129 may be configured for the page table 125 to limit access via setting permissions for the pages 127 including the mapped code pages and the mapped data pages. As will be discussed in more detail below, the page table 125 and appropriate page table attributes 129 may be generated and set during the configuration of the SMI handler 115, early in the initialization phase of the device 100 and prior to the SMI handler 115 being locked down.

The page table attributes 129 may include settings for one or more of the pages 127 of the page table 125 including the mapped code pages and the mapped data (non-code) pages. These settings in the page table attributes 129 may include permissions to write, read, and/or execute information and data in the pages 127. In some embodiments, a combination of permissions may be set for one or more pages 127 in the page table 125. The page table attributes 129 may ensure the pages 127 are protected and to prevent malicious attacks, such as a code injection attack. For example, all mapped code pages may be designated as read-only and execute such that any attempt to overwrite a code page will cause a page fault. In another example, all mapped data pages may be designated as execution disable (eXecutionDisable) such that any attempt to execute a data page will cause a page fault. In a third example, one or more of the mapped data pages may be designated as read and write (ReadWrite), while others may be designated as read-only (ReadOnly). More specifically, data pages that map the page table 125 itself, include critical data such as global descriptors and interrupt descriptors, and additional data such as information in the system management system table (SMST) data and SMM data. The SMM data may include structures such as the protocol database, S3 resume, script, and so forth. Thus, any attempt to write to a page set as read-only will cause a page fault. Embodiments are not limited in this manner and, in some instances, any page 127 that does not need to be written to at the runtime may be set as read-only.

In some instances, data in particular pages 127 may need to be accessed and written to during runtime. Thus, these pages 127 may be designated read and write and may include the program stack, dynamic global data, and the SMM state save area. Further, to ensure an optimal configuration and permission settings for the pages 127, embodiments may include the firmware 101 to cause data that requires read and write permissions to not reside on the same page as data that can be configured as read-only. In other words, the firmware 101, which may be part of the BIOS instructions, may configure the page table 125 and pages 127 such that data requiring read and write permissions does not reside on a same page as data requiring read-only permissions. Embodiments are not limited in this manner. The firmware 101 may perform a relocation operation to move read-only data to pages with other read-only data and move read and write data to pages with other read and write data, for example.

In some case, one or more pages 127 may be omitted from the page table 129. These pages 127 may be located in the OS/VMM 111 region. Omitting these pages 127 from the page table 125 will render benign many otherwise potentially exploitable bugs that could result in a "confused deputy" privilege escalation attack from the SMI handler 115.

As mentioned, the device 100 may also include the firmware 101 to configure various aspects of embodiments described herein. In some embodiments, the firmware 101 may be a set of instructions programmed or hardcoded into read-only memory that saves and holds information even when power is not being applied. The firmware 101 may at least partially be implemented as part of the system BIOS that is used to initiate the device 100 and various hardware components of the device 100, such as the CPU 120 and the memory 105.

The firmware 101 may be utilized to allocate the memory 105 for the SMRAM 107, initialize and install the SMI handler 115, and set the page table attributes 129. In some embodiments, the firmware 101 may set the page table attributes 129 during the initialization and installation of the SMI handler 115 prior to the SMI handler 115 being locked down. For example, power may be applied to the device 100 causing one or instructions to be fetched from flash memory and processed to begin a boot sequence of the device 100. As part of the initialization, various hardware components may be initialized and configured based on information in the firmware 101. For example, the CPU 120 may be configured and put into an initial state, the memory 105 may be initialized, other components and controllers may be initialized including I/O controllers, one or more storage devices, and so forth. The initialization process may continue and include installing the SMI handler 115 in the SMRAM 107, generating a page table 125 and pages 127 for the SMRAM 107 and generating page table attributes 129 for the page table 125.

In some instances, the firmware 101 may include one or more instructions that may be processed by circuitry, such as processing circuitry 124, to cause the allocation of regions of memory 105 for use by the device 100. One particular region may be the SMRAM 107 which may be used by the CPU 120 during processing in the SMM. During the allocation of the SMRAM 107, the SMI handler 115 code and SMM data to handle SMIs may be installed in the SMRAM 107. Typically, once the SMI handler 115 is installed into the SMRAM 107, the SMI handler 115 is locked and cannot be accessed by non-SMM code. Further, while it is possible for the SMI handler 115 to modify itself, once the initial configuration is complete and locked, the SMI handler 115 is static and cannot be modified. Thus, firmware 101 may also include one or more instructions to prohibit the SMI handler 115 from modifying itself, even during the initialization stage. Any exploitable vulnerabilities in the SMI handler 115 will also not have the ability to modify the SMI handler 115 itself adding another layer of protection from attack.

The firmware 101 may also include one or more instructions to generate the page table 125 and pages 127 for the SMRAM 107, for use while the CPU 120 is in the SMM. In some instances, the page table 125 and pages 127 may be generated during the dynamic phase of the SMI handler 115 installation before the SMI handler 115 is locked down and put into a static state. As part of the generation of the page table 125 and the pages 127, the instructions may apply the appropriate page protections and permissions to the page table 125 and pages 127 by setting one or more page table attributes 129. More specifically, the instructions may include setting one or more page table attributes 129 to specify read, write, and/or execution permissions for the page table 125 and pages 127. These page table attributes 129 may be set in a secure manner and may not be modified during processing while the CPU 120 is in the SMM.

As previously mentioned, the lock register 122-1 may be used by the device 100 to prevent malicious code and attacks using SMM code from modifying the page table attributes 129. More specifically, the lock register 122-1 may be used to lock or prevent modification of the paging related registers, such as the page table registers 122-2 and SMM related registers such as the SMM registers 122-3, as previously discussed. For example, the lock register 122-1 may be written to during the initiation of the SMM to ensure that the one or more page table attributes 129 configured during the initialization stage and installation of the SMI handler 115 are not overwritten or changed during operation in SMM.

The SMI Handler 115 can include a platform properties assessment module 130. In general, the PPAM 130 can be arranged to gather configuration information regarding the device 100, such as, for example, CPU 120, registers 122, page table 125, firmware 101, or the like and generate a report including indications of the configuration information. The PPAM 130 can further expose and provide the report to an application (e.g., application of OS/VMM 111) that called the SMI handler 115.

Figure 2:
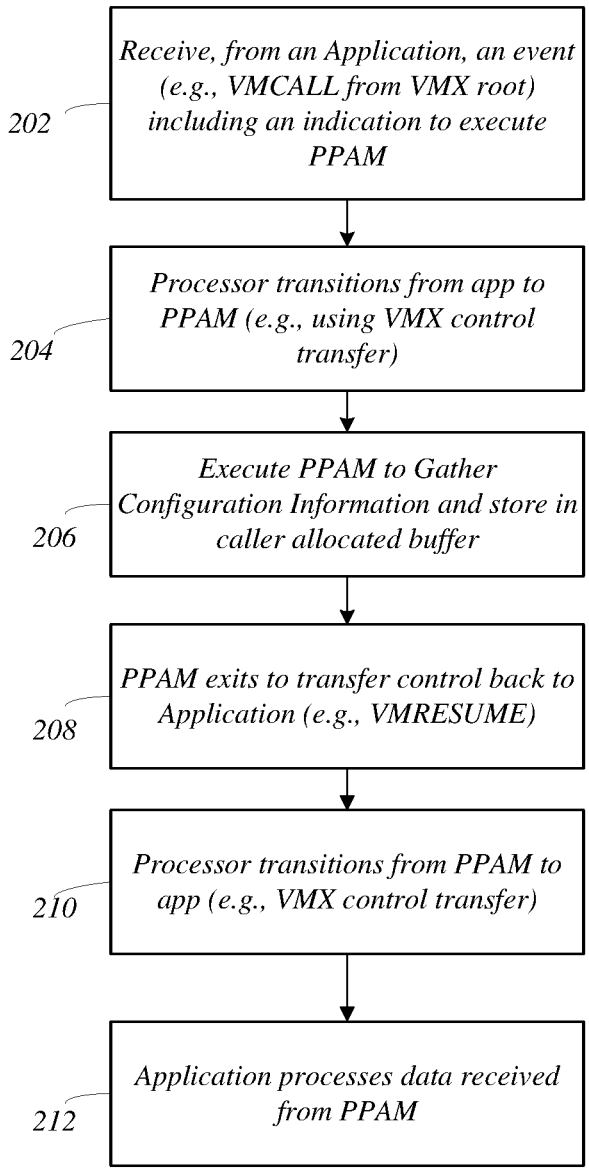
FIG. 2 illustrates an example of a first logic flow.

FIG. 2 illustrates one embodiment of a first logic flow 200. The logic flow 200 may be representative of some or all of the operations executed by one or more embodiments described herein. Further, the logic flow 200 may be performed by circuitry, such as the processing circuitry 124. Moreover, logic flow 200 may be performed in conjunction with one or more other logic flows discussed herein and lists steps occurring in a particular order.

The logic flow 200 may be one example flow to gather configuration information for a computer system, according to examples of the present disclosure. Logic flow 200 can begin at block 202. At block 202, a processor, such as CPU 120 of device 100, can receive an event from an application (e.g., application 111-4, or the like) including an indication to execute a PPAM 130. More particular, an application, such as may execute on OS/VMM 111 of device 100, can invoke a PPAM 130 by raising an event to a processor, such as CPU 120 of device 100, including an indication to execute PPAM 130. In some embodiment, such an event can be raised by VMCALL from VMX root mode, or the like.

Continuing to block 204, transition to executing the PPAM 130. Said differently, at block 204 CPU 120 transition from executing the application that issued the event (e.g., block 202) and can enter SMM to execute PPAM 130. In some embodiments, CPU 120 can implement a hardware interface, such as, for example, using the instruction VMCALL. In such an example, when VMCALL is executed (e.g., from a VMX root mode, or the like) CPU 120 can save the currently executing context and transfer execution in SMM to the PPAM as defined by the MSEG header.

Continuing to block 206, the CPU 120 can execute PPAM 130, and for example, gather configuration information (e.g., CPU register status, etc.) for device 100.

PPAM 130 can be arranged to implement several functions via this method. For example, PPAM 130 can provide an application programming interface (API) to retrieve PPAM implementation details and capabilities. This allows applications calling PPAM 130 to determine versioning and capabilities (e.g., of PPAM 130) such that the application can correctly interpret data returned by PPAM 130.

As another example, PPAM 130 can provide an API to return a platform configuration report to the calling application. For example, PPAM 130 can place the platform configuration report in the calling application memory, memory accessible to the calling application, or memory specified by the calling application. In some examples, the report can include indications (e.g., as a list, or the like) physical resources (e.g., memory, I/O, MSRs, etc.) consumed by SMI handler 115 as well as a list of meta-resources describing other relevant configuration properties not directly related to specific HW resource consumption. In some examples, physical resource descriptors are derived from the hardware configuration (e.g., as instantiated by BIOS, UEFI, or the like).

With some embodiments, the physical resource descriptors can include:
  Physical memory ranges visible to the BIOS SMI handler along with the access policies attributed to them (e.g. read only, or no execute).
  I/O ports access rules.
  MSR access rules (both read and write)

With some embodiments, the meta-resource descriptors can include Boolean values representing specific platform properties, such as, for example:
  True/False: All code memory regions mapped to SMM are marked ReadOnly+Execute
  True/False: All non-code memory regions mapped to SMM are marked NoExecute
  True/False: The page table is not writeable in SMM
  True/False: The physical-resources and meta-resources in the returned resource list are correct for the CPU associated with APIC_ID_x. (This allows for optimization of resource list generation)
  True/False: BIOS code at SMM entry point is correctly formatted and has known cryptographic hash (This is necessary to facilitate independence of the PPAM from the BIOS implementation details)
  True/False: Specific register is locked and cannot be changed by SMI handler (e.g. CR0, CR3, CR4, EFER, MISC_ENABLE, SMBASE, SMRR SMM_MONITOR_CONTROL, etc.)

With some embodiments, the meta-resource descriptors can include an opaque PPAM data region.

Continuing to block 208, PPAM can instruct CPU 120 to terminate execution of PPAM and return control to the calling application in OS/VMM 111, (e.g., VMRESUME instruction, or the like). That is, PPAM can send an instruction to the CPU to transfer control back to the application that issue the event, which resulted in PPAM executing (e.g., application from block 202).

Continuing to block 210, CPU 120 restores context of OS/VMM 111 as saved prior to execution of PPAM 130. More specifically, the CPU 120 can restore the context saved at block 204 and transfer control back to the application that originally called PPAM.

Continuing to block 212, the application running in OS/VMM 111 can process data returned to it by PPAM 130 in application addressable memory, or other storage. For example, the application can access reported generated by PPAM (e.g., at block 206, or the like).

Figure 3:
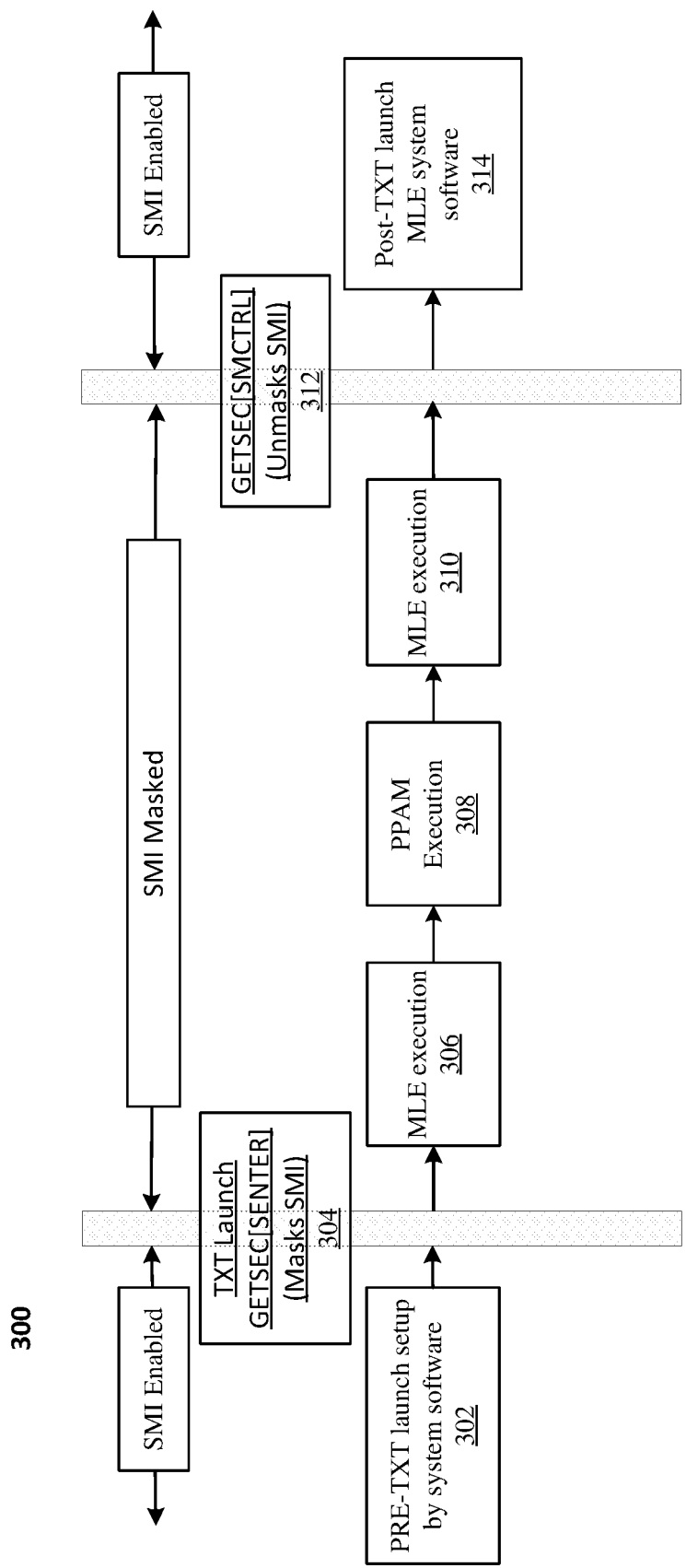
FIG. 3 illustrates an example of a second logic flow.

FIG. 3 illustrates one embodiment of a second logic flow 300. The logic flow 300 may be representative of some or all of the operations executed by one or more embodiments described herein. Further, the logic flow 300 may be performed by circuitry and/or one or more components discussed herein, such as the processing circuitry 124. Moreover, logic flow 300 may be performed in conjunction with one or more other logic flows discussed herein. The logic flow 300 may be one example flow to gather configuration information for a computer system, according to examples of the present disclosure. For example, logic flow 300 can be representative of a logic flow to initiate gather and exposing platform configuration via SMM, such as, for example, via PPAM 130 of SMI handler 115.

Logic flow 300 can begin at block 302. At block 302 SMI is enabled within the platform (e.g., device 100). At block 302, a processor, such as CPU 120 of device 100, can receive an SMI from an application including an indication to execute SMI handler 115. CPU 120 can, in response to receiving the SMI place indications of the SMI into memory 105.

Also, at block 302 system software may prepare for an Intel® TXT launch sequence 304 by moving all required software components into memory 105. For example, at block 302, system software may move a digitally singed module (e.g., SINIT AC module 111-1) into memory 105. As another example, at block 302 system software may move a measured launch environment module (MLE 111-2) into memory 105. As another example, at block 302 system software may allocate a region of memory 105 for the TPM Dynamic Log 111-3.

Continuing with block 302, system software may initiate the Intel® TXT launch process 304 by invoking the GETSEC[SENTER] instruction, or the like.

It is noted, that for blocks 304 to 310, SMI functions are masked within the platform. Continuing to block 304, CPU 120 prepares the platform for execution of the MLE module (e.g., MLE module 111-2). For example, Intel® TXT launch process 304, CPU 120 can rendezvous all HW threads but the one initializing MLE. As another example, at block 304

CPU 120 may mask the SMI event. As another example, at block 304 CPU 120 can setup an authenticated memory location (e.g., AC-RAM, or the like). As another example, at block 304 CPU 120 can load the SINIT AC module 111-1 into the authenticated memory location. As another example, at block 304 CPU 120 can cryptographically verify the SINIT. As another example, at block 304 CPU 120 can extend configuration registers (e.g., Trusted Platform (TPM) Platform Configuration Register (PCR), or the like). In a specific example, at block 304 CPU 120 can extend PCR17 with a hash of the SINIT AC module 111-1. As another example, at block 304 CPU 120 can transfer control to the authenticated code module (e.g., SINIT AC module 111-1, or the like). At block 304, CPU 120 may continue execution by transferring control to SINIT AC Module 111-1.

Continuing with block 304, SINIT AC Module 111-1 may record hashes of components the Intel® TXT launch process into the TPM dynamic log 111-3 and continue extending configuration registers for subsequent components (e.g. MLE 111-2 or PPAM 130). In a specific example, at block 304, SINIT AC module 111-1 may record its own hash into the TPM dynamic log 111-3. As another specific example, at block 304 SINIT 111-1 can extend PCR18 with a hash of the MLE 111-2 and record this hash in the TPM dynamic log 111-3. As another specific example, at block 304 SINIT 111-1 can extend PCR17 with a hash of the PPAM 130. In another specific example, at block 304, SINIT AC module 111-1 may record the hash of the PPAM 130 into the TPM dynamic log 111-3.

Continuing with block 304, SINIT AC Module 111-1 may transfer control to MLE 306 (e.g., via GETSEC[EXIT_AC], or the like). Continuing to block 306, CPU 120 and/or MLE 130 can prepare for PPAM 130 execution. In a specific example, at block 306, CPU 120 and/or MLE 111-2 can bring all CPUs into the MLE environment (e.g., via GETSEC[WAKEUP], or the like). In another specific example, at block 306 CPU 120 and/or MLE 111-2 can allocate a portion of OS/VMM memory 111 for use by PPAM 130 to store the PPAM output report 111-4. In another specific example, at block 306 MLE may initialize the PPAM output report buffer to zero. In another specific example, at block 306 CPU 120 and/or MLE 111-2 can verify correctness of the TPM dynamic log 111-3 by processing its contents and verifying the resulting hash against the TPM Continuing in block 306, when preparations for PPAM 130 execution 308 are complete, CPU 120 and/or MLE 306 may transfer control to PPAM 130 (e.g., via VMCALL from VMX root, or the like). This transfer of control may include parameters designating an API identifier (e.g., PPAM_GET_CAPABILITIES) and an MLE 111-2 allocated output buffer (e.g., PPMA output buffer 140, or the like). This transfer of control may be done on all CPU hardware threads.

At block 308 PPAM 130 can determine feature support detail. As an example, at block 308 PPAM 130 can fill the output buffer 140 (e.g., as described in FIG. 4, or the like) and can then return control to the MLE 310 (e.g. via VMRESUME, or the like).

At block 310, MLE 310 (e.g., MLE 111-2, or the like) can evaluate the resource output buffer to determine if the platform configuration as reported by the PPAM is compliant with MLE 310 platform configuration policy. As an example, at block 310 CPU 120 and/or MLE 310 can derive a value representing the configuration policy and extend this value to a PCR in the TPM. This value may indicate full compliance, full non-compliance, or anywhere in between. MLE 310 can then unseal trusted platform (e.g., TPM) secrets and continue to execute with access to secrets gated by the degree of compliance to platform configuration policy.

MLE 310 can then unmask SMI (e.g., using GETSEC [SMCTRL] 312, or the like). Control continues at block 314 with SMI unmasked, but with access to secrets gated or metered based on the MLE policy as related to the platform configuration as reported by the PPAM 130.

Figure 4:
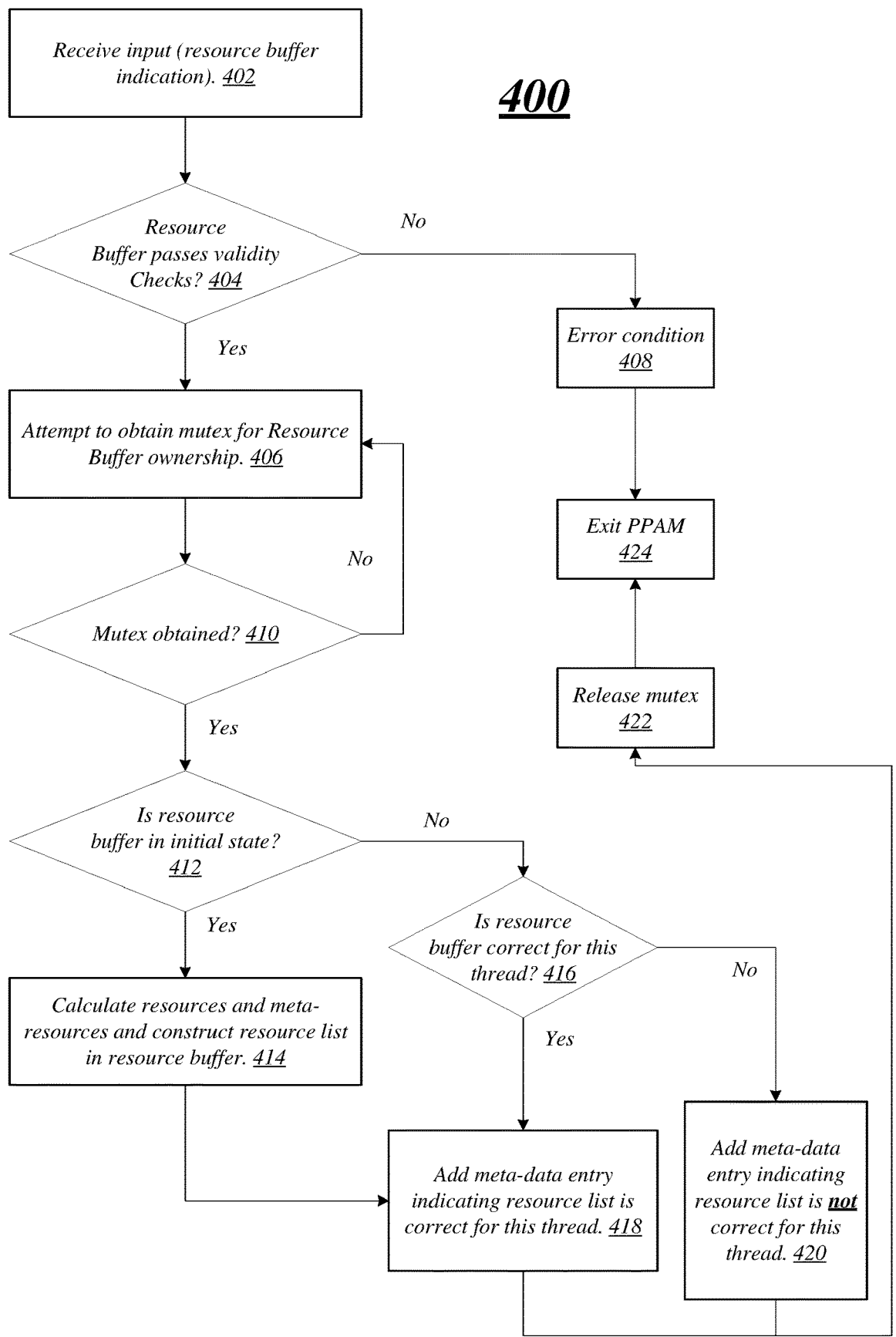
FIG. 4 illustrates examples of a third logic flow.

FIG. 4 illustrates one embodiment of a third logic flow 400. The logic flow 400 may be representative of some or all of the operations executed by one or more embodiments described herein. Further, the logic flow 400 may performed by circuitry, such as the processing circuitry 124. Moreover, logic flow 400 may be performed in conjunction with one or more other logic flows discussed herein. The logic flow 400 may be one example flow to gather configuration information for a computer system, according to examples of the present disclosure. For example, logic flow 400 can be representative of a logic flow to gather and expose platform configuration via SMM, such as, for example, as may be implemented by PPAM 130 of SMI handler 115.

In some examples, logic flow 400 can begin at block 402. At block 402, CPU 120 and/or PPAM 130 can receive an indication of a resource buffer (e.g., from an application calling PPAM 130, or the like). In some examples, the indication can comprise an address of a caller supplied memory buffer and/or a size (e.g., in bytes, or the like) of the resource buffer.

Continuing to decision block 404, CPU 120 and/or PPAM 130 can determine whether the resource buffer is valid. From decision block 404, logic flow 400 can continue to either block 406 or block 408. For example, logic flow 400 can continue from decision block 404 to block 408 based on a determination that the resource buffer is invalid. At block 406, CPU 120 and/or PPAM 130 can generate an error condition and continue to block 424 to initiate exiting SMM/PPAM. Alternatively, logic flow 400 can continue from decision block 404 to block 406 based on a determination that the resource buffer is valid.

At block 406, CPU 120 and/or PPAM 130, in response to a determination that the resource buffer is valid, can attempt to obtain a mutex (e.g., lock, ownership, or the like) of the resource buffer provided at block 402. Continuing to decision block 410, CPU 120 and/or PPMA 230 can determine whether the mutex is obtained. From decision block 410, logic flow 400 can either continue to decision block 412 of can return to block 406. For example, logic flow 400 can return to block 406 based on a determination that the mutex was not obtained and can re-attempt to obtain the mutex. Alternatively, logic flow 400 can continue from decision block 410 to block 412 based on a determination that the mutex was obtained.

At block 408, CPU 120 and/or PPAM 130 can determine whether the resource buffer is in an initial state. From decision block 412, logic flow 400 can continue to either block 412 or to decision block 416. For example, logic flow 400 can continue to block 414 based on a determination that the resource buffer is in an initial state. Alternatively, logic flow 400 can continue from decision block 412 to decision block 416 based on a determination that the resource buffer is not in an initial state.

At block 414, CPU 120 and/or PPAM 130, in response to determining that the resource buffer is in an initial state, can calculate resources and meta-resources (e.g., as detailed above) and construct a list of the resources in the resource buffer. Logic flow 400 can continue from block 414 to block 418.

At decision block 416, CPU 120 and/or PPAM 130 can determine whether the resource buffer is correct for the thread calling the SMI handler 115. From decision block 416, logic flow 400 can continue to either block 418 or block 410. For example, logic flow 400 can continue to block 418 based on a determination that the resource buffer is correct for the thread calling the SMI handler 115. Alternatively, logic flow 400 can continue from decision block 416 to block 420 based on a determination that the resource buffer is not correct for the thread calling the SMI handler 115.

At block 418, CPU 120 and/or PPAM 130 can add a meta-entry to the resource list enumerated in resource buffer indicating that list is correct for the thread. At block 420, CPU 120 and/or PPAM 130 can add a meta-entry to the resource list enumerated in resource buffer indicating that list is not correct for the thread.

Logic flow 400 can continue from blocks 418 and 420 to block 422. At block 420, CPU 120 and/or PPAM 130 can release the mutex on resource buffer and continue to block 424 to initiate exiting SMM/PPAM.

Figure 5:
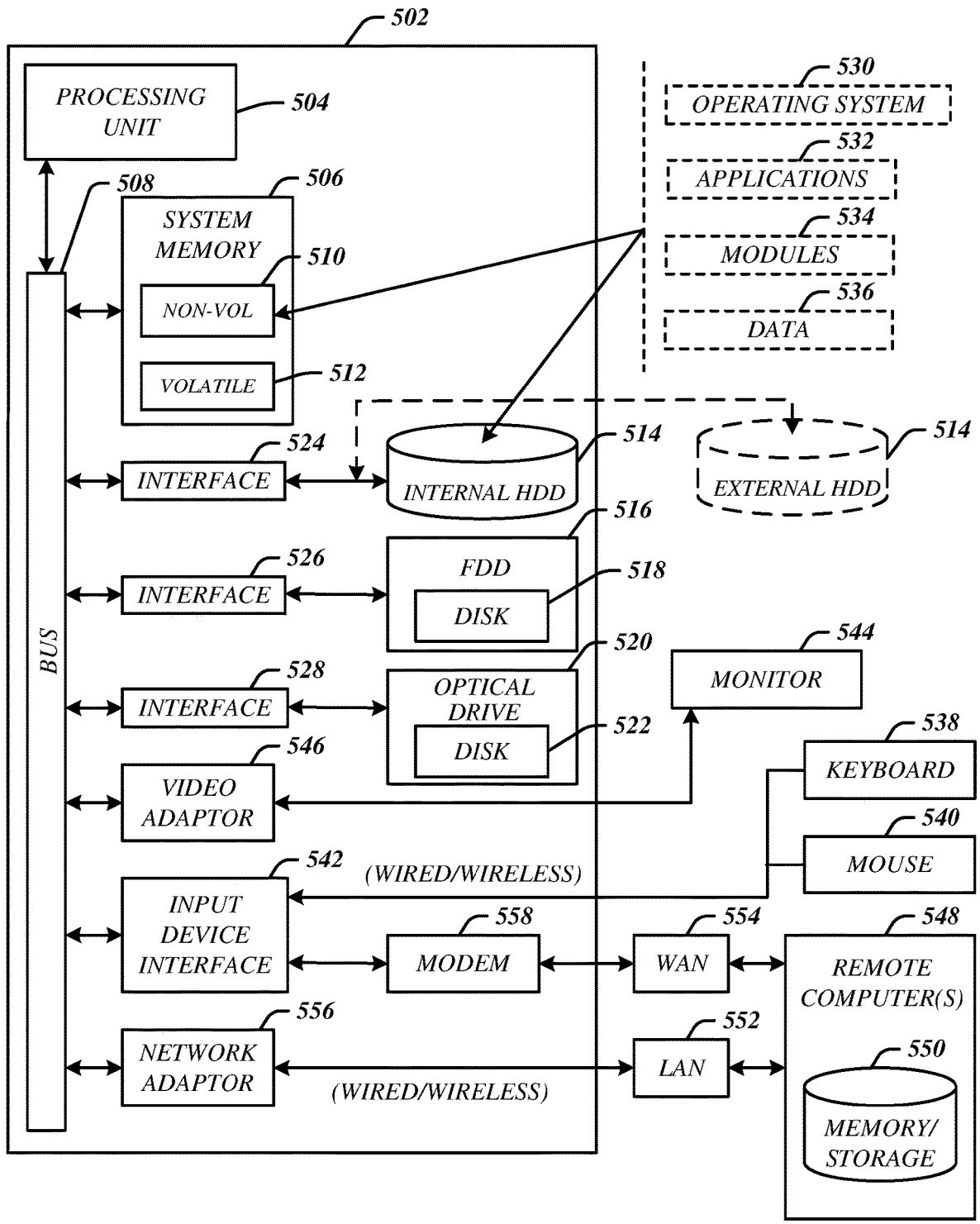
FIG. 5 illustrates an example embodiment of a device.

FIG. 5 illustrates an embodiment of an exemplary computing architecture 500 suitable for implementing various embodiments as previously described. In one embodiment, the computing architecture 500 may include or be implemented as part of device 100 and/or device 900.

As used in this application, the terms "system" and "component" are intended to refer to a computer-related entity, either hardware, a combination of hardware and software, software, or software in execution, examples of which are provided by the exemplary computing architecture 500. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 500 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 500.

As shown in this figure, the computing architecture 500 includes a processing unit 504, a system memory 506 and a system bus 508. The processing unit 504 can be any of various commercially available processors.

The system bus 508 provides an interface for system components including, but not limited to, the system memory 506 to the processing unit 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 500 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in this figure, the system memory 506 can include non-volatile memory 510 and/or volatile memory 512. A basic input/output system (BIOS) can be stored in the non-volatile memory 510.

The computer 502 may include various types of computer-readable storage media in the form of one or more lower speed memory units, including an internal (or external) hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the system bus 508 by a HDD interface 524, an FDD interface 526 and an optical drive interface 528, respectively. The HDD interface 524 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536. In one embodiment, the one or more application programs 532, other program modules 534, and program data 536 can include, for example, the various applications and/or components of the system 700.

A user can enter commands and information into the computer 502 through one or more wire/wireless input devices, for example, a keyboard 538 and a pointing device, such as a mouse 540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 504 through an input device interface 542 that is coupled to the system bus 508, but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. The monitor 544 may be internal or external to the computer 502. In addition to the monitor 544, a computer typically includes other peripheral output devices, such as speakers, printers, and so forth.

The computer 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all of the elements described relative to the computer 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet.

When used in a LAN networking environment, the computer 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computer 502 can include a modem 558, or is connected to a communications server on the WAN 554, or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computer 502, or portions thereof, can be stored in the remote memory/storage device 550. It will be appreciated that the network connections shown are exemplary and other means of establishing a communications link between the computers can be used.

The computer 502 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

The various elements of the device 100 and 500 as previously described with reference to FIGS. 1-5 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 6:
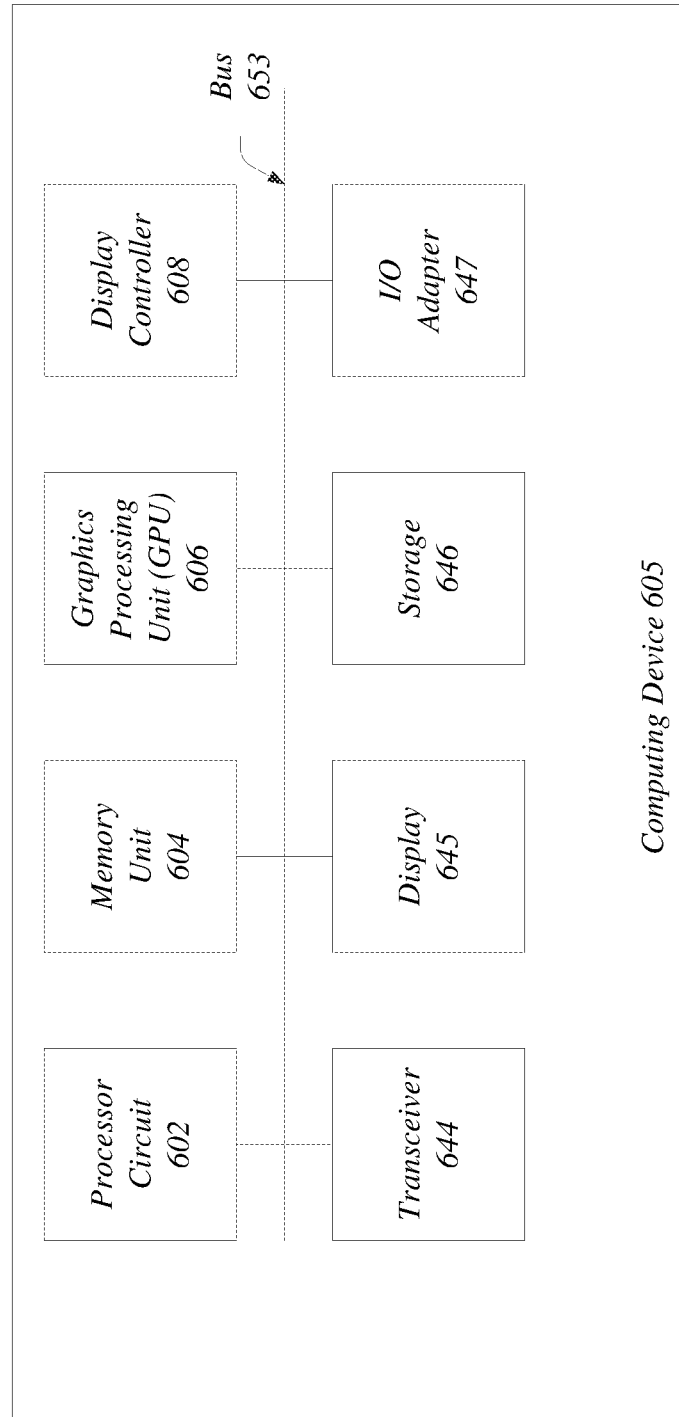
FIG. 6 illustrates an exemplary embodiment of a first computing architecture.

FIG. 6 illustrates one embodiment of a system 600. In various embodiments, system 600 may be representative of a system or architecture suitable for use with one or more embodiments described herein, such as device 100.

As shown in this figure, system 600 may include multiple elements. One or more elements may be implemented using one or more circuits, components, registers, processors, software subroutines, modules, or any combination thereof, as desired for a given set of design or performance constraints. Although this figure shows a limited number of elements in a certain topology by way of example, it can be appreciated that more or less elements in any suitable topology may be used in system 600 as desired for a given implementation. The embodiments are not limited in this context.

In various embodiments, system 600 may include a computing device 605 which may be any type of computer or processing device including a personal computer, desktop computer, tablet computer, netbook computer, notebook computer, laptop computer, server, server farm, blade server, or any other type of server, and so forth.

Examples of a computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

In various embodiments, computing device 605 may include processor circuit 602. Processor circuit 602 may be implemented using any processor or logic device. The processing circuit 602 may be one or more of any type of computational element, such as but not limited to, a microprocessor, a processor, central processing unit, digital signal processing unit, dual core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, or any other type of processor or processing circuit on a single chip or integrated circuit. The processing circuit 602 may be connected to and communicate with the other elements of the computing system via an interconnect 743, such as one or more buses, control lines, and data lines.

In one embodiment, computing device 605 may include a memory unit 604 to couple to processor circuit 602. Memory unit 604 may be coupled to processor circuit 602 via communications bus 653, or by a dedicated communications bus between processor circuit 602 and memory unit 604, as desired for a given implementation. Memory unit 04 may be implemented using any machine-readable or computer-readable media capable of storing data, including both volatile and non-volatile memory. In some embodiments, the machine-readable or computer-readable medium may include a non-transitory medium. The embodiments are not limited in this context.

Computing device 605 may include a graphics processing unit (GPU) 606, in various embodiments. The GPU 606 may include any processing unit, logic or circuitry optimized to perform graphics-related operations as well as the video decoder engines and the frame correlation engines. The GPU 606 may be used to render 2-dimensional (2-D) and/or 3-dimensional (3-D) images for various applications such as video games, graphics, computer-aided design (CAD), simulation and visualization tools, imaging, etc. Various embodiments are not limited in this manner; GPU 606 may process any type of graphics data such as pictures, videos, programs, animation, 3D, 2D, objects images and so forth.

In some embodiments, computing device 605 may include a display controller 608. Display controller 608 may be any type of processor, controller, circuit, logic, and so forth for processing graphics information and displaying the graphics information. The display controller 608 may receive or retrieve graphics information from one or more buffers. After processing the information, the display controller 608 may send the graphics information to a display.

In various embodiments, system 600 may include a transceiver 644. Transceiver 644 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, transceiver 644 may operate in accordance with one or more applicable standards in any version. The embodiments are not limited in this context.

In various embodiments, computing device 605 may include a display 645. Display 645 may constitute any display device capable of displaying information received from processor circuit 602, graphics processing unit 606 and display controller 608.

In various embodiments, computing device 605 may include storage 646. Storage 646 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 646 may include technology to increase the storage performance enhanced protection for valuable digital media when multiple hard drives are included, for example. Further examples of storage 646 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, computing device 605 may include one or more I/O adapters 647. Examples of I/O adapters 647 may include Universal Serial Bus (USB) ports/adapters, IEEE 1394 Firewire ports/adapters, and so forth. The embodiments are not limited in this context.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The disclosure now turns to a number of illustrative examples.

Example 1

An apparatus, comprising: memory; and logic, at least a portion of which is implemented in processing circuitry coupled to the memory, the logic to: gather, in response to an event, configuration information for the apparatus; and expose the gathered configuration information to attest to a configuration of a portion a system management mode (SMM).

Example 2

The apparatus of example 1, wherein the event is a VMX EXIT, an interrupt, or a system management interrupt.

Example 3

The apparatus of example 1, logic to store an indication of the event in the memory.

Example 4

The apparatus of example 1, the logic to store a signed portion of the SMM in the memory.

Example 5

The apparatus of example 4, the logic to load the signed portion of the SMM into a secure memory partition.

Example 6

The apparatus of example 5, the logic to cryptographically verifying the authenticity of the dynamically signed portion of the SMM.

Example 7

The apparatus of example 5, the logic to initialize the secure memory partition from at least one of the memory or a trusted memory location.

Example 8

The apparatus of example 4, the logic to: initialize at least one configuration register; and create an event log.

Example 9

The apparatus of example 8, the logic to: add a hash of the signed portion of the SMM to a one of the at least one configuration registers; and update the event log with an indication that the hash of the signed portion of the SMM has been added to the one of the at least one configuration registers.

Example 10

The apparatus of example 9, the logic to verify the hash of the signed portion of the SMM against a reference hash.

Example 11

The apparatus of example 10, the reference hash to be stored in one of the at least one configuration registers.

Example 12

The apparatus of example 1, the memory comprising an application queue including indications of a plurality of threads to be executed by the processing circuitry, the logic to: determine a plurality of resources associated with the apparatus; and determine resource requirements of at least one thread of the plurality of threads.

Example 13

The apparatus of example 12, the logic to rendezvous the least one thread of the plurality of threads.

Example 14

The apparatus of example 13, wherein the at least one thread of the plurality of threads is associated with the event.

Example 15

The apparatus of example 14, the logic to: determine whether the plurality of resources support the determined resource requirements; and execute the event based on a determination that the plurality of resources supports the determined resource requirements.

Example 16

A method, comprising: gathering, via a processing circuit in response to an event, configuration information for a computing platform; and exposing the gathered configuration information to attest to a configuration of at least a portion of a system management mode (SMM).

Example 17

The method of example 15, wherein the event is a VMX EXIT, an interrupt, or a system management interrupt.

Example 18

The method of example 15, comprising storing an indication of the event in the memory.

Example 19

The method of example 15, comprising storing a signature block of the event in the memory.

Example 20

The method of example 19, comprising storing a signed portion of the SMM in the memory.

Example 21

The method of example 20, comprising loading the signed portion of the SMM into a secure memory partition.

Example 22

The method of example 21, comprising cryptographically verifying the authenticity of the dynamically signed portion of the SMM.

Example 23

The method of example 20, comprising initializing the secure memory partition.

Example 24

The method of example 15, comprising: initializing at least one configuration register; and creating an event log.

Example 25

The method of example 24, comprising: adding a hash of the signed portion of the SMM to a one of the at least one configuration registers; and updating the event log with an indication that the hash of the signed portion of the SMM has been added to the one of the at least one configuration registers.

Example 26

The method of example 25, comprising verifying the hash of the signed portion of the SMM against a reference hash.

Example 27

The method of example 26, the reference hash to be stored in one of the at least one configuration registers.

Example 28

The method of example 15, the memory comprising an application queue including indications of a plurality of threads to be executed by the processing circuitry, the method comprising: determining a plurality of resources associated with the computing platform; and determining resource requirements of at least one thread of the plurality of threads.

Example 29

The method of example 28, comprising rendezvousing at least one of the plurality of threads.

Example 30

The method of example 29, wherein the at least one threads is associated with the event.

Example 31

The method of example 25, comprising: determining whether the plurality of resources supports the determined resource requirements; and executing the event based on a determination that the plurality of resources supports the determined resource requirements.

Example 32

At least one machine-readable storage medium comprising instructions that when executed by a processor at a computing platform, cause the processor to: gather, in response to an event, configuration information for the computing platform; and expose the gathered configuration information to attest to a configuration of at least a portion of a system management mode (SMM).

Example 33

The at least one machine-readable storage medium of example 32, wherein the event is a VMX EXIT, an interrupt, or a system management interrupt.

Example 34

The at least one machine-readable storage medium of example 32, comprising instructions that further cause the processor to store an indication of the event in a memory of the computing platform.

Example 35

The at least one machine-readable storage medium of example 34, comprising instructions that further cause the processor to store a signature block of the SMI in the memory.

Example 36

The at least one machine-readable storage medium of example 34, comprising instructions that further cause the processor to store a signed portion of the SMM in the memory.

Example 37

The at least one machine-readable storage medium of example 36, comprising instructions that further cause the processor to load the signed portion of the SMM into a secure memory partition.

Example 38

The at least one machine-readable storage medium of example 37, comprising instructions that further cause the processor to cryptographically verify the authenticity of the dynamically signed portion of the SMM.

Example 39

The at least one machine-readable storage medium of example 36, comprising instructions that further cause the processor to initialize the secure memory partition.

Example 40

The at least one machine-readable storage medium of example 32, comprising instructions that further cause the processor to: initialize at least one configuration register; and create an event log.

Example 41

The at least one machine-readable storage medium of example 35, comprising instructions that further cause the processor to: add a hash of the signed portion of the SMM to a one of the at least one configuration registers; and update the event log with an indication that the hash of the signed portion of the SMM has been added to the one of the at least one configuration registers.

Example 42

The at least one machine-readable storage medium of example 41, comprising instructions that further cause the processor to verify the hash of the signed portion of the SMM against a reference hash.

Example 43

The at least one machine-readable storage medium of example 42, the reference hash to be stored in one of the at least one configuration registers.

Example 44

The at least one machine-readable storage medium of example 32, a memory of the computing platform comprising an application queue including indications of a plurality of threads to be executed by the processing circuitry, the medium comprising instructions that further cause the processor to: determine a plurality of resources associated with the apparatus; and determine resource requirements of at least one thread of the plurality of threads.

Example 45

The at least one machine-readable storage medium of example 44, comprising instructions that further cause the processor to rendezvous the at least one of the plurality of threads.

Example 46

The at least one machine-readable storage medium of example 45, wherein the at least one threads is associated with the event.

Example 47

The at least one machine-readable storage medium of example 44, comprising instructions that further cause the processor to: determine whether the plurality of resources supports the determined resource requirements; and execute the event based on a determination that the plurality of resources supports the determined resource requirements.

Example 48

An apparatus comprising means to perform the method of any one of examples 16 to 31.

What is claimed is:
1. An apparatus, comprising:
  memory; and
  logic, at least a portion of which is implemented in processing circuitry coupled to the memory, the logic to:
    store, responsive to a system management interrupt (SMI), an indication of the SMI in the memory;
    store a dynamically signed portion of a system management mode (SMM) called by the SMI in the memory;
    initialize at least one configuration register;
    add a hash of the dynamically signed portion of the SMM to a one of the at least one configuration registers;
    update an event log with an indication that the hash of the dynamically signed portion of the SMM has been added to the one of the at least one configuration registers;
    load instructions corresponding to the SMM into the memory;
    derive a hash of the instructions corresponding to the SMM loaded into the memory; and
    verify the SMM based at least in part on the derived hash and the hash of the dynamically signed portion of the SMM in the one of the at least one configuration registers to attest to an authenticity of the SMM.
2. The apparatus of claim 1, the logic to store a signature block of the SMI in the memory.
3. The apparatus of claim 1, the logic to:
  load the dynamically signed portion of the SMM into a secure memory partition; and
  cryptographically verify the authenticity of the dynamically signed portion of the SMM.
4. The apparatus of claim 3, the logic to initialize the secure memory partition from at least one of the memory or a trusted memory location.
5. The apparatus of claim 1, the memory comprising an application queue including indications of a plurality of threads to be executed by the processing circuitry, the logic to:
  determine a plurality of resources associated with the apparatus; and
  determine resource requirements of at least one thread of the plurality of threads.
6. The apparatus of claim 5, the logic to rendezvous at least one of the plurality of threads.
7. The apparatus of claim 6, wherein the at least one threads is not associated with the SMI.
8. The apparatus of claim 5, the logic to:
  determine whether the plurality of resources support the determined resource requirements; and
  execute the SMM based on a determination that the plurality of resources support the determined resource requirements.
9. A method, comprising:
  storing, via a processing circuit responsive to a system management interrupt (SMI) asserted against the processing circuit, an indication of the SMI in memory of a computing platform;
  storing a dynamically signed portion of a system management mode (SMM) called by the SMI in the memory;
  initializing at least one configuration register of the computing platform;
  adding a hash of the dynamically signed portion of the SMM to a one of the at least one configuration registers;
  updating an event log with an indication that the hash of the dynamically signed portion of the SMM has been added to the one of the at least one configuration registers;
  loading instructions corresponding to the SMM into the memory;

deriving a hash of the instructions corresponding to the SMM loaded into the memory; and verifying the SMM based at least in part on the derived hash and the hash of the dynamically signed portion of the SMM in the one of the at least one configuration registers to attest to an authenticity of a system management mode (SMM) called by the SMI.

10. The method of claim 9, comprising:
storing a signature block of the SMI in the memory.

11. The method of claim 10, comprising:
loading the dynamically signed portion of the SMM into a secure memory partition; and
cryptographically verifying the authenticity of the dynamically signed portion of the SMM.

12. The method of claim 11, comprising:
initializing the secure memory partition from at least one of the memory or a trusted memory location.

13. The method of claim 9, comprising:
loading instructions corresponding to the SMM into the memory;
deriving a hash of the instructions corresponding to the SMM loaded into the memory; and
verifying the SMM based at least in part on the derived hash and the hash of the dynamically signed portion of the SMM in the one of the at least one configuration registers.

14. The method of claim 9, the memory comprising an application queue including indications of a plurality of threads to be executed by the processing circuit, the method comprising:
determining a plurality of resources associated with the computing platform; and
determining resource requirements of at least one thread of the plurality of threads.

15. The method of claim 14, comprising:
determining whether the plurality of resources support the determined resource requirements; and
executing the SMM based on a determination that the plurality of resources support the determined resource requirements.

16. At least one non-transitory machine-readable storage medium comprising instructions that when executed by a processor at a computing platform, cause the processor to:
store, responsive to a system management interrupt (SMI) asserted against the processor, an indication of the SMI in memory of the computing platform;
store a dynamically signed portion of a system management mode (SMM) called by the SMI in the memory;
initialize at least one configuration register of the computing platform;
add a hash of the dynamically signed portion of the SMM to a one of the at least one configuration registers;
update an event log with an indication that the hash of the dynamically signed portion of the SMM has been added to the one of the at least one configuration registers;
load instructions corresponding to the SMM into the memory;
derive a hash of the instructions corresponding to the SMM loaded into the memory; and
verify the SMM based at least in part on the derived hash and the hash of the dynamically signed portion of the SMM in the one of the at least one configuration registers to attest to an authenticity of a system management mode (SMM) called by the SMI.

17. The at least one non-transitory machine-readable storage medium of claim 16, comprising instructions that further cause the processor to:
store a signature block of the SMI in a memory of the computing platform;
load the dynamically signed portion of the SMM into a secure memory partition; and
cryptographically verify the authenticity of the dynamically signed portion of the SMM.

18. The at least one non-transitory machine-readable storage medium of claim 16, a memory of the computing platform comprising an application queue including indications of a plurality of threads to be executed by the processor, the medium comprising instructions that further cause the processor to:
determine a plurality of resources associated with the computing platform; and
determine resource requirements of at least one thread of the plurality of threads;
determine whether the plurality of resources support the determined resource requirements; and
execute the SMM based on a determination that the plurality of resources supports the determined resource requirement.

* * * * *